US012559092B2

(12) United States Patent
Chen et al.

(10) Patent No.: US 12,559,092 B2
(45) Date of Patent: Feb. 24, 2026

(54) VEHICLE CONTROL DEVICE INCLUDING OBJECT DETECTION UNIT FOR COLLISION AVOIDANCE, VEHICLE CONTROL METHOD, AND PROGRAM

(71) Applicant: TOYOTA JIDOSHA KABUSHIKI KAISHA, Aichi-ken (JP)

(72) Inventors: Xi Chen, Nagoya (JP); Tsunekazu Yasoshima, Nagoya (JP); Kazuya Okamoto, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 238 days.

(21) Appl. No.: 18/461,514

(22) Filed: Sep. 6, 2023

(65) Prior Publication Data

US 2024/0092354 A1 Mar. 21, 2024

(30) Foreign Application Priority Data

Sep. 16, 2022 (JP) ................................. 2022-148149

(51) Int. Cl.
B60W 30/09 (2012.01)
B60W 40/02 (2006.01)
(52) U.S. Cl.
CPC ............ B60W 30/09 (2013.01); B60W 40/02 (2013.01); B60W 2554/80 (2020.02)
(58) Field of Classification Search
CPC ............................... B60W 30/09; B60W 40/02
See application file for complete search history.

(56) References Cited

U.S. PATENT DOCUMENTS

| | | | |
|---|---|---|---|
| 9,105,190 B2 | 8/2015 | Akiyama | |
| 9,393,960 B2 | 7/2016 | Kodaira | |
| 9,463,795 B2 * | 10/2016 | Minemura | ........ B60W 30/0956 |
| 9,483,945 B2 | 11/2016 | Okita et al. | |
| 9,873,412 B2 | 1/2018 | Moriizumi | |
| 10,793,147 B2 | 10/2020 | Kaminade et al. | |
| 2004/0016870 A1 * | 1/2004 | Pawlicki | .............. B62D 15/025 |
| | | | 315/77 |
| 2008/0208408 A1 * | 8/2008 | Arbitmann | ............ B60W 10/20 |
| | | | 701/41 |

(Continued)

FOREIGN PATENT DOCUMENTS

| | | |
|---|---|---|
| JP | 2019-028951 A | 2/2019 |
| JP | 2020-012702 A | 1/2020 |

*Primary Examiner* — Jess Whittington
(74) *Attorney, Agent, or Firm* — HAUPTMAN HAM, LLP

(57) ABSTRACT

To suppress unnecessary operation of PCS control, provided is a vehicle control device comprising a detection unit for detecting an object located in diagonally forward of an own vehicle as a diagonally forward object; and an ECU including at least one processor. The ECU programmed to execute a collision avoidance control for avoiding a collision between own vehicle and one moving object detected as the diagonally forward object by the detection unit or reducing damage to the collision when the one moving object detected as the diagonally forward object satisfies a predetermined collision condition. The ECU programmed to suppress the collision avoidance control based on the one moving object when the other moving object or a stationary object is detected within a predetermined area in the vicinity of the one moving object by the detecting unit.

4 Claims, 6 Drawing Sheets

(56)     References Cited

U.S. PATENT DOCUMENTS

| | | | |
|---|---|---|---|
| 2010/0315505 A1* | 12/2010 | Michalke | G06T 7/251 |
| | | | 348/118 |
| 2016/0116593 A1* | 4/2016 | Kim | G01S 17/931 |
| | | | 356/5.01 |
| 2016/0171898 A1* | 6/2016 | Silver | G08G 5/80 |
| | | | 701/3 |
| 2019/0039614 A1* | 2/2019 | Nagata | B60W 10/20 |
| 2019/0196481 A1* | 6/2019 | Tay | G01S 17/86 |
| 2020/0001877 A1* | 1/2020 | Burca | G01C 21/28 |
| 2020/0012295 A1* | 1/2020 | Kim | G06Q 10/0631 |
| 2020/0166649 A1* | 5/2020 | Terefe | G01S 17/86 |
| 2021/0061309 A1* | 3/2021 | Kawanai | B60W 60/00 |
| 2021/0107521 A1 | 4/2021 | Fujita et al. | |
| 2021/0107528 A1 | 4/2021 | Fujita et al. | |
| 2021/0146956 A1 | 5/2021 | Fujita et al. | |
| 2021/0146958 A1 | 5/2021 | Tanaka et al. | |
| 2022/0063664 A1* | 3/2022 | Liu | B60W 10/18 |
| 2022/0221868 A1* | 7/2022 | Mujica | G05D 1/617 |
| 2023/0145218 A1* | 5/2023 | Murray | G06N 7/01 |
| | | | 701/24 |

* cited by examiner

VEHICLE CONTROL DEVICE INCLUDING OBJECT DETECTION UNIT FOR COLLISION AVOIDANCE, VEHICLE CONTROL METHOD, AND PROGRAM

RELATED APPLICATIONS

The present application claims priority to Japanese Patent Application No. 2022-148149, filed Sep. 16, 2022, the disclosure of which is hereby incorporated by reference herein in its entirety.

BACKGROUND OF THE INVENTION

1. Field of the Invention

The present disclosure relates to a vehicle control device, a vehicle control method, and a program.

2. Description of the Related Art

Japanese Patent Application Laid-Open (kokai) No. 2020-12702 discloses a device that executes collision avoidance control for automatically activating a braking device when a moving object recognized by a millimeter-wave radar that detects an object located in front-and-lateral direction of a own vehicle is highly likely to collide with a own vehicle. Such collision-avoidance control is also referred to as PCS control (Pre-Crash Safety Control).

When an object located in front-and-lateral direction of own vehicle is recognized by the camera, the camera has higher an object recognition capability than the millimeter-wave radar, so that the accuracy of PCS control can be improved, but there is a problem that the cost of the device is increased. For this reason, a configuration in which an object located in front-and-lateral direction of own vehicle is recognized by the millimeter-wave radar is generally adopted.

However, in a configuration in which an object located in front-and-lateral direction of own vehicle is recognized by the millimeter-wave radar, an accessory that exhibits a behavior that differs from that of the main body may be recognized as a moving object different from that of the main body. As a specific example, there are cases where the fans of the outdoor unit are recognized as moving objects different from the outdoor unit, or the wheels of the preceding vehicle traveling on diagonally forward of own vehicle are recognized as moving objects different from the preceding vehicle. When PCS control is executed based on such a false recognition, there is a possibility that PCS control is unnecessarily operated even though the moving object is not actually approaching own vehicle.

SUMMARY OF THE INVENTION

The present disclosure has been devised in order to solve the above-mentioned problem. That is, one object of the present disclosure is to effectively suppress unnecessary operation of PCS control.

A device according to at least one embodiment of the present disclosure is a vehicle control device. The vehicle control device comprising an object detection unit (40) for detecting an object located in diagonally forward of an own vehicle as a diagonally forward object; and an electronic control unit (10) including at least one processor. The electronic control unit (10) programmed to execute a collision avoidance control for avoiding a collision between own vehicle and one moving object (WH, F) detected as the diagonally forward object by the object detection unit (40) or reducing damage to the collision when the one moving object (WH, F) detected as the diagonally forward object satisfies a predetermined collision condition. The electronic control unit (10) programmed to suppress the collision avoidance control based on the one moving object (WH, F) when the other moving object (VB) or a stationary object (UB) is detected within a predetermined area in the vicinity of the one moving object (WH, F) by the object detecting unit (40).

According to the above aspect, the ECU (10) suppresses the execution of the collision avoidance control based on one moving object (WH, F) when detecting one moving object (WH, F) as the diagonally forward object and detecting the other moving object (VB) or a stationary object (UB) as the main body of one moving object (WH, F) within a predetermined area in the vicinity of one moving object (WH, F). This makes it possible to effectively suppress unnecessary operation of the collision avoidance control.

In another aspect of the present disclosure, the electronic control unit (10) is programmed to calculate an index value (RD) indicating a possibility that the one moving object (WH, F) detected by the object detection unit (40) exists. The electronic control unit (10) is programmed, when the index value (RD) is equal to or larger than a predetermined threshold value (RDth) and the one moving object (WH, F) satisfies the collision condition, executes the collision avoidance control based on the one moving object (WH, F). The electronic control unit (10) is programmed, when the object detection unit (40) detects the other moving object (VB) or the stationary object (UB) within the predetermined area, suppress the collision avoidance control based on the one moving object (WH, F) by reducing the index value (RD).

In another aspect of the present disclosure, the electronic control unit (10) is programmed to, in the case that the object detection unit (40) detects the other moving object (VB), and when the one moving object (WH, F) and the other moving object (VB) are located in an adjoining lane adjacent to a lane in which own vehicle (SV) is traveling and within a predetermined distance in front of own vehicle (SV), suppress the collision avoidance control based on the one moving object (WH, F). The electronic control unit (10) is programmed to, in the case that the object detection unit (40) detects the stationary object (UB), and when the one moving object (F) and the stationary object (UB) are located within a set range set with reference to an average external dimension of an outdoor unit, suppress the collision avoidance control based on the one moving object (F).

In order to facilitate the understanding of the invention, in the above description, the constituent elements of the invention corresponding to at least one embodiment of the present disclosure are suffixed in parentheses with reference symbols used in the at least one embodiment. However, the constituent elements of the invention are not intended to be limited to those in the at least one embodiment as defined by the reference symbols.

DESCRIPTION OF THE EMBODIMENTS

Description is now given of a vehicle control device, a vehicle control method, and a program according to at least one embodiment of the present disclosure with reference to the drawings.

[Hardware Configuration]

Figure 1:
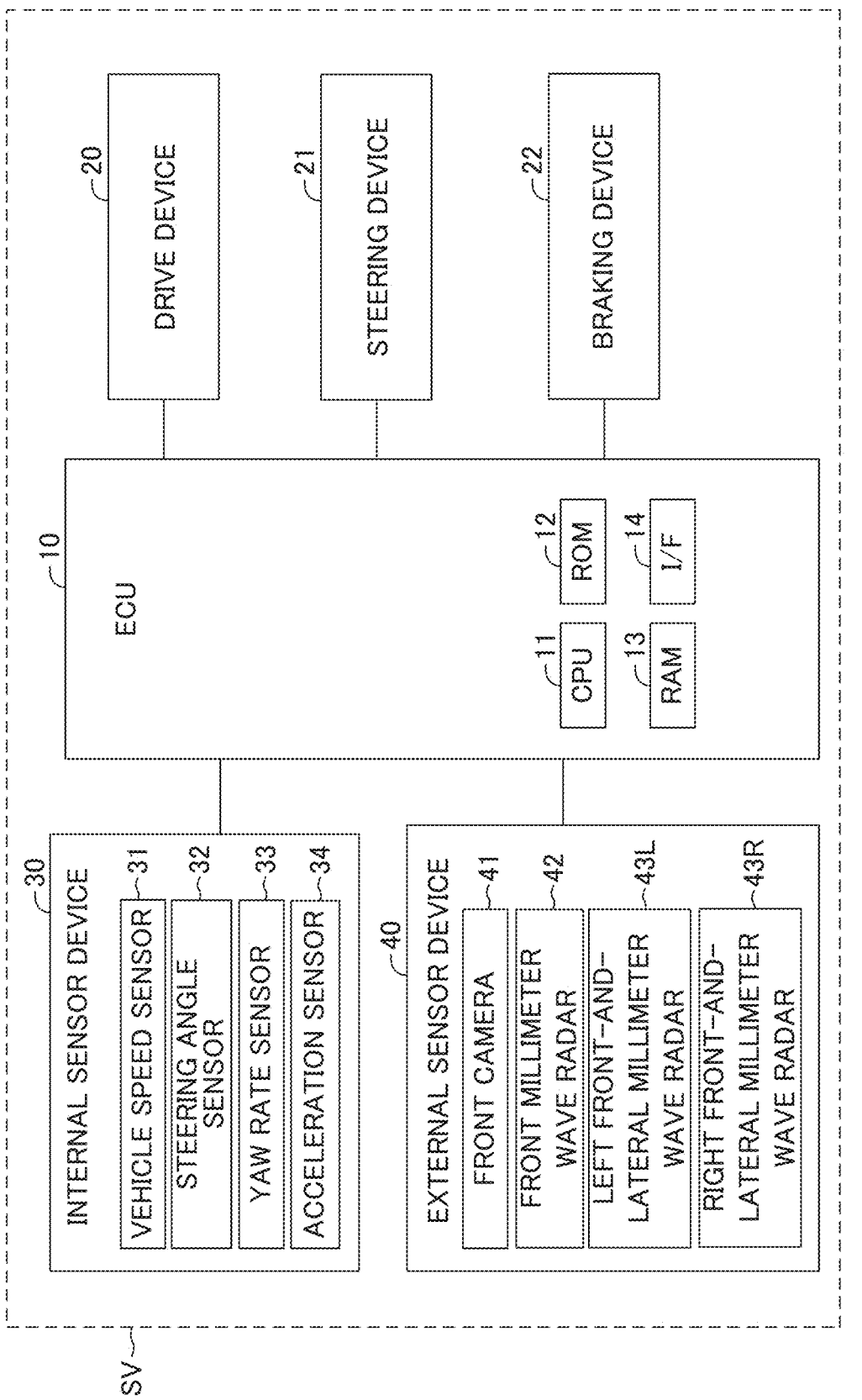
FIG. 1 is a schematic diagram showing a hardware configuration of a vehicle according to the present embodiment.

FIG. 1 is a schematic overall configuration diagram of a vehicle SV according to the at least one embodiment. Hereinafter, the vehicle SV may be referred to as an own vehicle when it is required to distinguish it from other vehicles.

The vehicle SV has an ECU 10. ECU is an abbreviation for Electronic Control Unit. The ECU 10 includes a CPU (Central Processing Unit) 11, ROM (Read Only Memory) 12, RAM (Random Access Memory) 13, an interface device 14, and the like. The CPU 11 executes various programs stored in the ROM 12. The ROM 12 is a non-volatile memory that stores data and the like required for the CPU 11 to execute various programs. The RAM 13 is a volatile memory to provide a working region that is deployed when various programs are executed by the CPU 11. The interface device 14 is a communication device for communicating with an external device.

The ECU 10 is a central device which executes driving assistance control of the vehicle SV, such as PCS control. Driving assistance control is a concept which encompasses automatic driving control. Therefore, a drive device 20, a steering device 21, a braking device 22, an internal sensor device 30, an external sensor device 40, etc. are communicably connected to the ECU 10.

The drive device 20 generates a driving force to be transmitted to driving wheels of the vehicle SV. As the drive device 20, for example, an engine and a motor are given. In the device according to the at least one embodiment, the vehicle SV may be any one of a hybrid electric vehicle (HEV), a plug-in hybrid electric vehicle (PHEV), a fuel cell electric vehicle (FCEV), a battery electric vehicle (BEV), and an engine vehicle. The steering device 21 applies steering forces to steerable wheels of the vehicle SV. The braking device 22 applies a braking force to the wheels of the vehicle SV.

The internal sensor device 30 is sensors which acquire states of the vehicle SV. Specifically, the internal sensor device 30 includes a vehicle speed sensor 31, a steering angle sensor 32, a yaw rate sensor 33, an acceleration sensor 34, and the like.

The vehicle speed sensor 31 detects a travel speed (vehicle speed V) of the vehicle SV. The steering angle sensor 32 detects a rotational angle of a steering wheel or a steering shaft (not shown) of the vehicle SV, that is, the steering angle sensor 32 detects a steering angle S. The yaw rate sensor 33 detects a yaw rate of the vehicle SV. The acceleration sensor 34 detects an acceleration G of the vehicle SV. The internal sensor device 30 transmits the condition of the vehicle SV detected by the sensors 31 to 34 to the ECU 10 at a predetermined cycle.

The external sensor device 40 is sensors which acquire an object information related to objects present in front and diagonally front sides of the vehicle SV. Specifically, the external sensor device 40 includes a front camera 41, a front millimeter wave radar 42, a left front-and-lateral millimeter wave radar 43L, and a right front-and-lateral millimeter wave radar 43R. Hereinafter, when the front millimeter wave radar 42, the left front-and-lateral millimeter wave radar 43L, and the right front-and-lateral millimeter wave radar 43R do not need to be distinguished, they are also referred to as "millimeter wave radar". When the left front-and-lateral side millimeter wave radar 43L and the right front-and-lateral millimeter wave radar 43R do not need to be distinguished from each other, they are also referred to as "front side millimeter wave radar 43".

Figure 2:
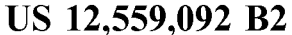
FIG. 2 is a schematic diagram for explaining the installation of the external sensor device.

As shown in FIG. 2, the front camera 41 is provided on a central portion CT2 in the vehicle width direction. The central portion CT2 is positioned on an upper portion of a front window of the vehicle SV. The front camera 41 is, for example, a stereo camera or a monocular camera, and a digital camera having an image pickup element such as a CMOS or a CCD can be used. The front camera 41 acquires captured images by capturing a captured region PR in front of the vehicle SV. The captured region PR is a wide-angle region having a central angle θ3 and extending from the central portion CT2 toward the front in the front-rear axial direction of the vehicle SV. The front camera 41 acquires the object information related to the object present in front of the vehicle SV by processing the captured images. The front camera 41 transmits the acquired object information to the ECU 10 at a predetermined cycle. The object information acquired by the front camera 41 is information indicating the type of an object detected in front of the vehicle SV, a relative distance between the vehicle SV and an object, a relative velocity between the vehicle SV and an object, and the like. The type of the object may be recognized by, for example, machine-learning such as pattern matching.

The millimeter wave radar radiates a radio wave (millimeter wave) in a millimeter wave band, and receives the millimeter wave (reflected wave) reflected by a target existing within a radiation range. The millimeter wave radar acquires the object information around the vehicle SV based on a phase difference between the transmitted millimeter wave and the received reflected wave, an attenuation level of the reflected wave, a time from the transmission of the millimeter wave to the reception of the reflected wave, and the like, and transmits the acquired object information to the ECU 10 at a predetermined cycle. The object information is information indicating a relative distance between the vehicle SV and the target, a relative speed between the vehicle SV and the target, and the like.

As shown in FIG. 2, the front millimeter-wave radar 42 is provided on a central portion CT2 in the vehicle width direction. The front millimeter wave radar 42 receives millimeter waves reflected by an object (hereinafter, referred to as a front object) located in a detection region DF in front of the vehicle SV, and detects the front object. The detection region DF is a wide-angle region that extends by angle θ1 in the left direction and the right direction from the central axis C1. The central axis C1 is an axis extending from the central portion CT1 toward the front in the front-rear axis direction of the vehicle SV.

The left front-and lateral millimeter-wave radar 43L is disposed on the left end portion LE of the front end of the vehicle SV in the vehicle widthwise direction. The left front-and lateral millimeter-wave radar 43L detects an object (hereinafter, referred to as a left front-and-lateral object) located in the detection region DSL on the left front-and lateral side of the vehicle SV. The detection region DSL is a wide-angle region that extends by angle θ2 in the left direction and the right direction from a central axis C2. The central axis C2 is an axis extending from the left end portion LE toward the left diagonally front side of the vehicle SV.

The right front-and-lateral millimeter-wave radar 43R is disposed on the right end portion RE of the front end of the vehicle SV. The right front-and lateral millimeter-wave radar 43R detects an object (hereinafter, referred to as a right front-and-lateral object) located in the detection region DSR on the right front-and-lateral side of the vehicle SV. The detection region DSR is a wide-angle region that extends by an angle θ2 in the left direction and the right direction from a central axis C3. The central axis C3 is an axis extending from the right end portion RE toward the right diagonally front side of the vehicle SV.

When there is no need to distinguish between the detection region DSL and DSR, these are sometimes referred to as "front-and-lateral detection region DS". An object detected by the left front-and-lateral millimeter wave radar 43L and the right front-and-lateral millimeter wave radar 43R may be referred to as a "front-and-lateral object".

[Outline of PCS Control Operation]

Next, an outline of operation of PCS control by the ECU 10 will be described. The ECU 10 can perform front PCS control and lateral PCS control. The front PCS control and the lateral PCS control are controls for avoiding collision with the front object and the front-and-lateral object or reducing damage to the collision, respectively. When there is no need to distinguish between the front PCS control and the lateral PCS control, these may be referred to as "PCS control".

Figure 3:
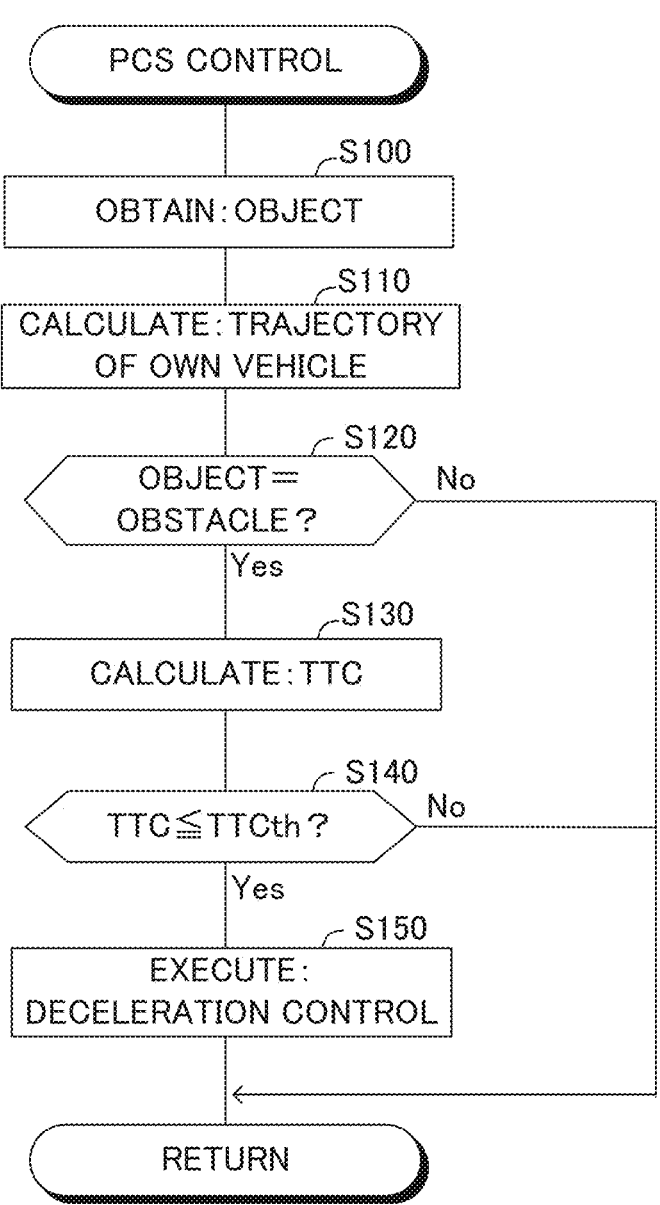
FIG. 3 is a flow chart for explaining a routine of PCS control.

The ECU 10 basically executes PCS control in accordance with a flowchart shown in FIG. 3. As a first step, The ECU 10 obtains the coordinate information of the object present in region in front and in front-and-lateral of own vehicle SV based on an object information transmitted from the external sensor device 40 (step S100). Further, the ECU 10 calculates the turning radius of own vehicle SV based on the detection results of the vehicle speed sensor 31, the steering angle sensor 32, and the yaw rate sensor 33, and calculates the trajectory of own vehicle SV based on the turning radius (step S110). Process of the step S100 and the step S110 may be out of order and may be concurrent.

The ECU 10 determines whether the object is an obstacle (step S120). Specifically, the ECU 10 determines, for the forward PCS control, whether the moving object and the stationary object in front of own vehicle SV are obstacles that may collide with own vehicle SV. The ECU 10 also determines, for lateral PCS control, whether the moving object in front-and-lateral side of own vehicle SV is an obstacle that may collide with own vehicle SV. When the object is a moving object, the ECU 10 calculates the trajectory of the moving object based on the coordinate information of the moving object, and determines the moving object as an obstacle when the trajectory of the moving object intersects the trajectory of own vehicle SV. In addition, ECU 10 determines that the stationary object is an obstacle when the trajectory of own vehicle SV intersects the present position of the stationary object.

When the ECU 10 determines that the object is an obstacle, it calculates a predicted time (collision predicted time (Time-To-Collision: TTC) until own vehicle SV collides with the obstacle based on the distance L from own vehicle SV to the obstacle and the relative velocity Vr of own vehicle SV relative to the obstacle (step S130). TTC is an index indicating a possibility that own vehicle SV collides with an obstacle. TTC can be determined by dividing the distance L from own vehicle SV to the obstacle by the relative-velocity Vr (TTC=L/Vr). The ECU 10 determines whether TTC is equal to or less than a predetermined collision-determination-threshold TTCth (step S140). When TTC is less than or equal to the collision determination threshold TTCth, the ECU 10 determines that own vehicle SV is likely to collide with the obstacle, and executes a deceleration control (step S150). The deceleration control is a control for decelerating the vehicle SV such that the deceleration of the vehicle SV coincides with a preset target deceleration by controlling the operation of the braking device 22.

Here, as shown in FIG. 2, the ECU 10 executes the front PCS control for the front object located in region (hereinafter referred to as front detection region FR) where the detection region DF and the captured region PR overlap. A portion of the front detection region FR overlaps the detection region DS of the front-and-lateral millimeter-wave radar 43. Hereinafter, a region in which the front detection region FR and the detection region DS overlap is referred to as an overlap region OR. The ECU 10 integrates a radar object information transmitted from the front millimeter-wave radar 42 and a camera object information transmitted from the front camera 41 to recognize the moving object and the stationary object present in the front detection region FR as a front object. In the present embodiment, since the captured region PR includes the detection region DF, the front detection region FR is substantially the detection region DF.

On the other hand, as shown in FIG. 2, The ECU 10 executes lateral PCS control for the front-and-lateral object located at a region (hereinafter referred to as "non-overlapping region ER") that does not overlap with the front detection region FR in the detection region DS of the front-and-lateral millimeter-wave radar 43. Based on the radar object data transmitted from the front-and-lateral millimeter-wave radar 43, the ECU 10 recognizes a moving object existing in the non-overlapping region ER as the front-and-lateral object. Here, since the front-and-lateral object is recognized only based on the radar object information transmitted from the front-and-lateral millimeter wave radar 43, an object recognition accuracy of the non-overlapping region ER is relatively lower than an object recognition accuracy of the front detection region FR integrating the camera object information. For this reason, it is desired to grasp whether the front-and-lateral object is an actual object on the basis of some index.

When the lateral PCS control is executed, the ECU 10 calculates the reliability RD of the front-and-lateral object, and determines that the reliability RD is equal to or greater than a predetermined threshold reliability RDth as the execution condition of the deceleration control. The reliability RD is an index indicating a possibility that the front-and-lateral object is actually present. The higher the reliability RD, the more likely the front-and-lateral object is to exist. The calculation of the reliability RD will be described below.

[Calculation Process of Reliability]

Figure 4:
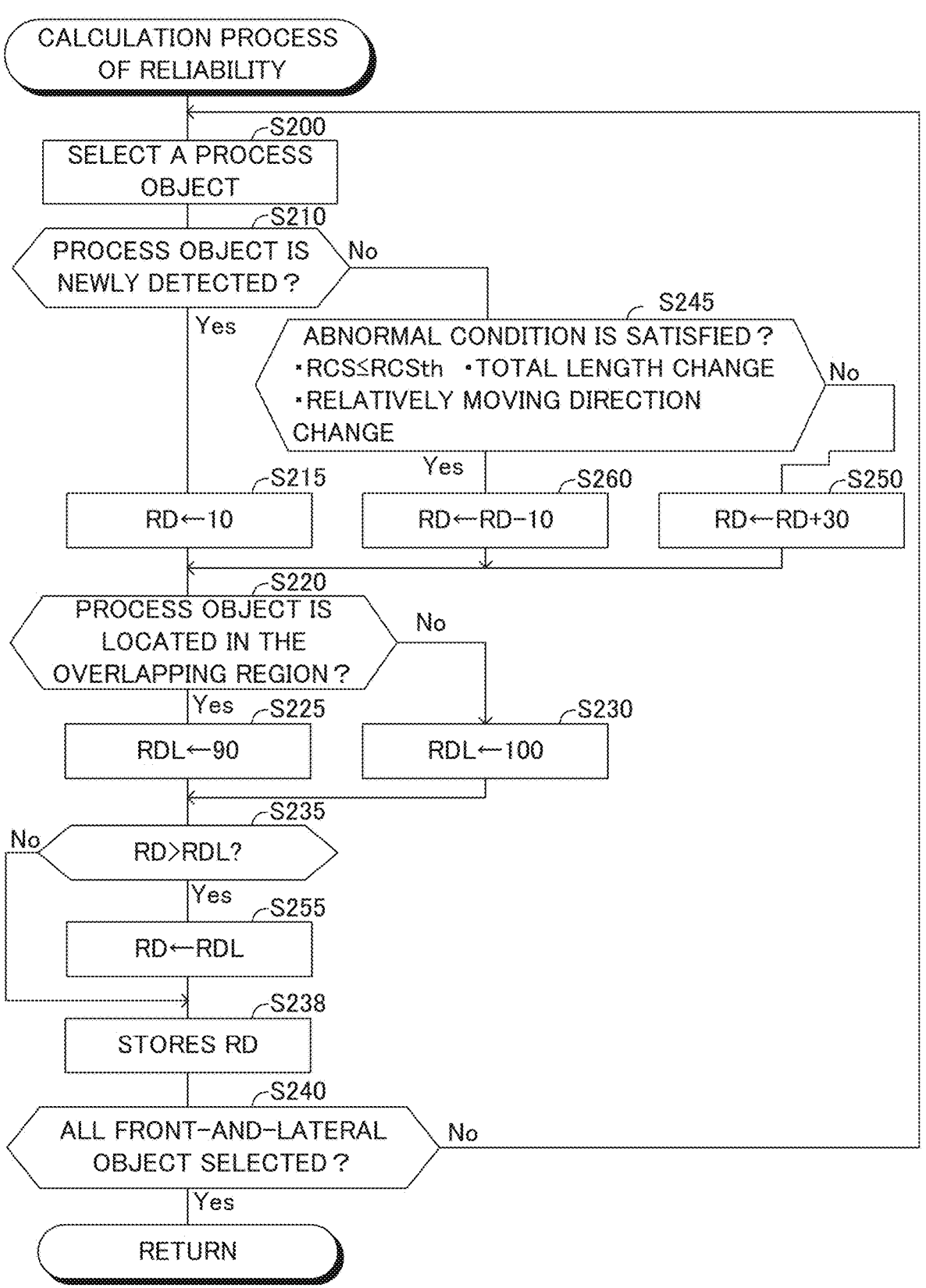
FIG. 4 is a flow chart for explaining a routine of the calculation process of reliability.

FIG. 4 is a flow chart for explaining a routine of calculation process of reliability RD by the ECU 10. This routine is started when own vehicle SV runs.

In step S200, the ECU 10 selects one front-and-lateral object from the front-and-lateral objects as a process object. Then, in step S210, the ECU 10 determines whether the process object is a newly detected object. If the process object is a newly detected object (Yes), the ECU 10 executes step S215 and step S220 in sequence.

In step S215, the ECU 10 sets the reliability RD to "10". Then, in step S220, the ECU 10 determines whether the process object is located in the overlapping region OR.

In the determination of the step S220, if the process object is located in the overlapping region OR (Yes), the ECU 10 proceeds the process to step S225 and sets the upper limit reliability RDL to "90". On the other hand, in the determination of the step S220, if the process object is not located in the overlapping region OR (that is, when the process object is located in the non-overlapping region ER), the ECU 10 proceeds the process to step S230 and sets the upper limit reliability RDL to "100".

In the present embodiment, the above-described threshold reliability RDth is set to "95", for example. Therefore, when the front-and-lateral object is located in the overlapping region OR, the ECU 10 does not execute the lateral PCS control since the reliability RD does not exceed the threshold reliability RDth. The ECU 10 then executes the front PCS control. On the other hand, when the front-and-lateral object is located in the non-overlapping region ER, the ECU 10 may execute the lateral PCS control since the reliability RD may be greater than or equal to the threshold reliability RDth.

Thereafter, the ECU 10 proceeds the process to step S235 and determines whether the reliability RD is greater than the upper limit reliability RDL. If the reliability RD is less than or equal to the upper limit reliability RDL (No), the ECU 10 sequentially executes process of the step S238 and the step S240. If the reliability RD is greater than the upper limit reliability RDL (Yes), the ECU 10 proceeds the process to step S255 and sets the reliability RD to the upper limit reliability RDL. The ECU 10 then proceeds the process to step S238. If it is determined in step S235 that the reliability RD is equal to or lower than the upper limit reliability RDL (No), the ECU 10 skips process of step S255 and proceeds the process to step S238.

In step S238, the ECU 10 stores the reliability RD of the process object in RAM. Then, in step S240, the ECU 10 determines whether all front-and-lateral object have been selected as process objects. If all front-and-lateral object have not yet been selected as process objects (No), the ECU 10 returns to process in step S200 to select a new process object.

If process object selected in step S200 is not a newly detected object, the ECU 10 determines the judgement result as "No" in step S210 and proceeds the process to step S245. In step S245, the ECU 10 determines whether an abnormal condition is satisfied or not. Specifically, the ECU 10 determines in step S245 that the abnormal condition is satisfied when at least one of the following a condition A1 to a condition A3 is satisfied.

The condition A1: RCS (Radar-reflected Cross-Sectional area) shall be less than or equal to the threshold RCSth.

RCS represents criteria for the capability of an object to reflect millimeter waves. The smaller RCS, the shorter the range in which the object can be detected. For example, if an object with a very short detectable range is detected as a front-and-lateral object, the front-and-lateral object is likely to be erroneously detected. Therefore, the condition A1 is one of the abnormal conditions.

Condition A2: A magnitude of the difference between the total length of a process object detected this time (the total length this time) and the total length of a process object detected last time (the total length last time) is equal to or greater than the threshold.

If the magnitude of the difference in the total length is equal to or larger than the threshold value, it is unlikely that the process object detected this time is the same object as the process object detected last time, and it is highly likely that the process object detected this time is erroneously detected. Therefore, the condition A2 is one of the abnormal conditions.

Condition A3: A magnitude of a difference between an angle θ between a relatively moving direction MD of a process object detected this time and the front-rear axial direction and the angle θ between a relatively moving direction MD of a process object detected last time and the front-rear axial direction is equal to or larger than a threshold.

When the magnitude of the difference between the angles θ is equal to or larger than the threshold value, the relative moving directional MD is suddenly changed, and the process object detected this time is unlikely to be the same object as the process object detected last time, and the process object detected this time is likely to be erroneously detected. Therefore, the condition A3 is one of the abnormal conditions.

The ECU 10 may determine that the abnormal condition is satisfied even when at least one of the condition A4 and A5 is satisfied.

Conditional A4: A Microwave Doppler has been detected.

Conditional A5: The pedestrian likelihood representing the pedestrianicity of a process object is less than or equal to the thresholds.

When the abnormal condition is not satisfied in the determination of step S245 (No), the ECU 10 proceeds the process to step S250. In step S250, the ECU 10 adds "30" to the reliability RD. The ECU 10 then proceeds the process to step S220 and executes process after step S220.

On the other hand, when it is determined in step S245 that the abnormal condition is satisfied (Yes), the ECU 10 proceeds the process to step S260. In step S260, the ECU 10 subtracts "10" from the reliability RD. The ECU 10 then proceeds the process to step S220 and executes process after step S220. When the ECU 10 proceeds the process to step 240, if all front-and-lateral objects are selected as process objects (Yes), the ECU 10 terminates the routine once.

The ECU 10 repeats the calculation process illustrated in FIG. 4, and thereby, the front-and-lateral object (moving object) whose reliability RD is increased to the threshold reliability RDth or more is set as an operation target of the deceleration control by the lateral PCS control. That is, the ECU 10 determines whether the moving object which reliability RD is increased to a threshold reliability RDth or more is an obstacle that may collide with own vehicle SV, and executes the deceleration control when TTC is equal to or less than the collision determination threshold TTCth. However, even a moving object which reliability RD is gradually increased by the calculation process shown in FIG. 4 may not actually be a moving object approaching own vehicle SV.

Figure 5B:
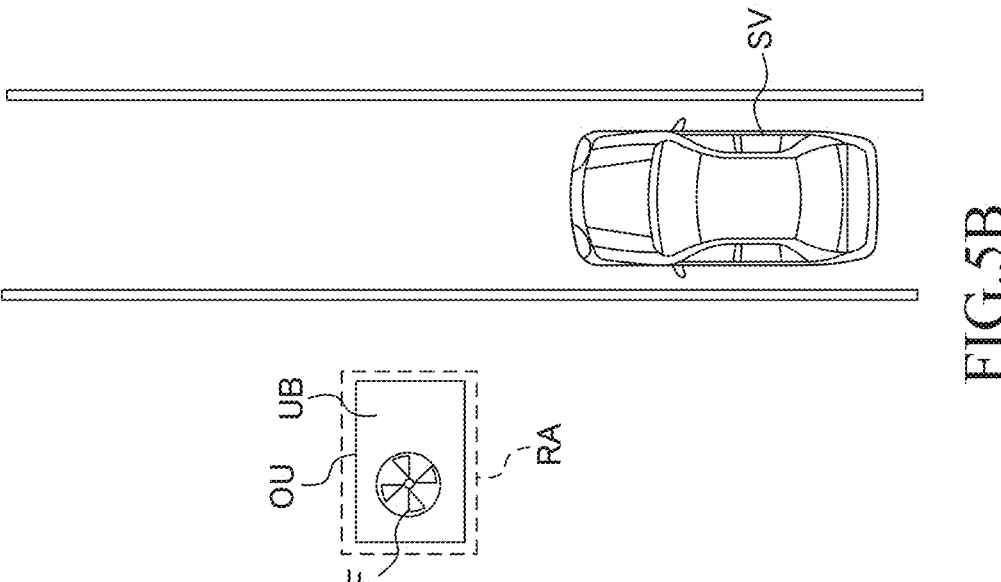
FIG. 5 is a schematic diagram illustrating a specific embodiment of a diagonally forward object which is mis-recognized as a moving object.
Figure 5A:
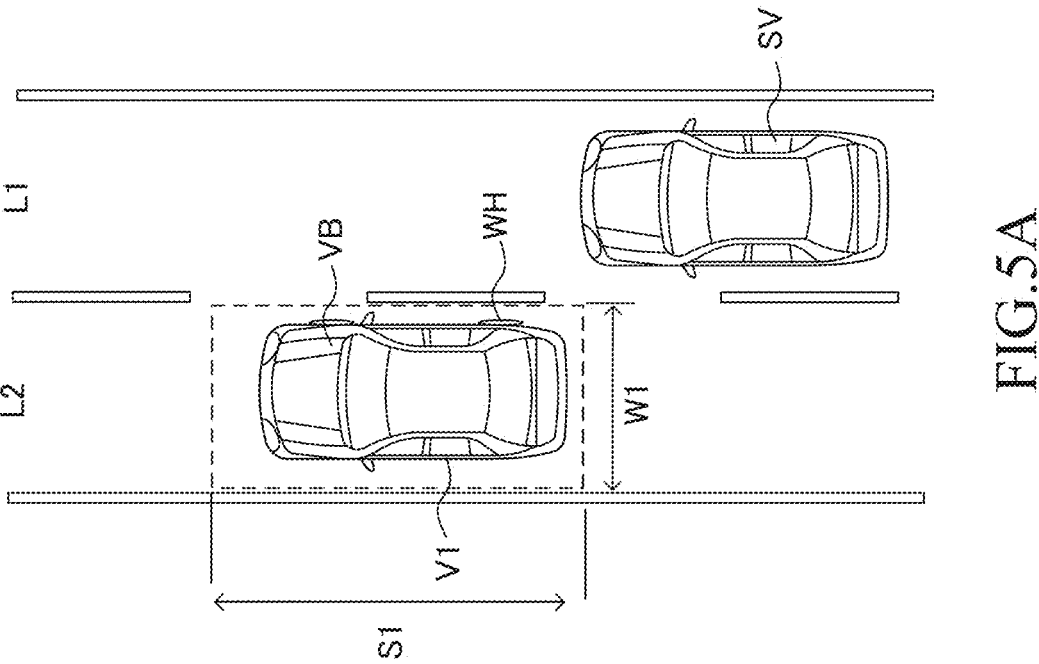

As shown in FIG. 5A, examples of such a moving object include the wheel WH of the preceding vehicle V1 traveling on the front-and-lateral side of own vehicle SV. In addition, as shown in FIG. 5B, examples of such a moving object include the fan F of the outdoor unit OU on the front-and-lateral side of own vehicle SV. The wheel WH rotates while the body VB of the wheel WH moves in substantially the same direction as own vehicle SV. Further, while the outdoor unit main body UB serving as the main body portion of the fan F is stationary, the fan F rotates.

That is, the wheel WH and the fans F does not actually approach own vehicle SV, but have a velocity transverse to own vehicle SV by a rotational movement that differs from the main body. Therefore, the front-and-lateral millimeter wave radar 43 may erroneously recognize the wheel WH of the preceding vehicle V1 or the fan F of the outdoor unit OU as the moving object different from the main body portion (the vehicle body VB, outdoor unit main body UB). Hereinafter, the front-and-lateral object which is erroneously recognized as the moving object different from the main body portion by the front-and-lateral millimeter wave radar 43 is referred to as a "ghost object". When such the ghost object is subject to the lateral PCS control, unnecessary operation of the deceleration control may be caused.

The ECU 10 determines whether the moving object is the ghost object when the front-and-lateral millimeter wave radar 43 acquires the moving object of unknown type, and reduces the reliability RD when the moving object is determined to be the ghost object, thereby suppressing the execution of the lateral PCS control and suppressing the unnecessary operation of the deceleration control. Hereinafter, a specific process of the lateral PCS control will be described.

[Lateral PCS Control]

Figure 6:
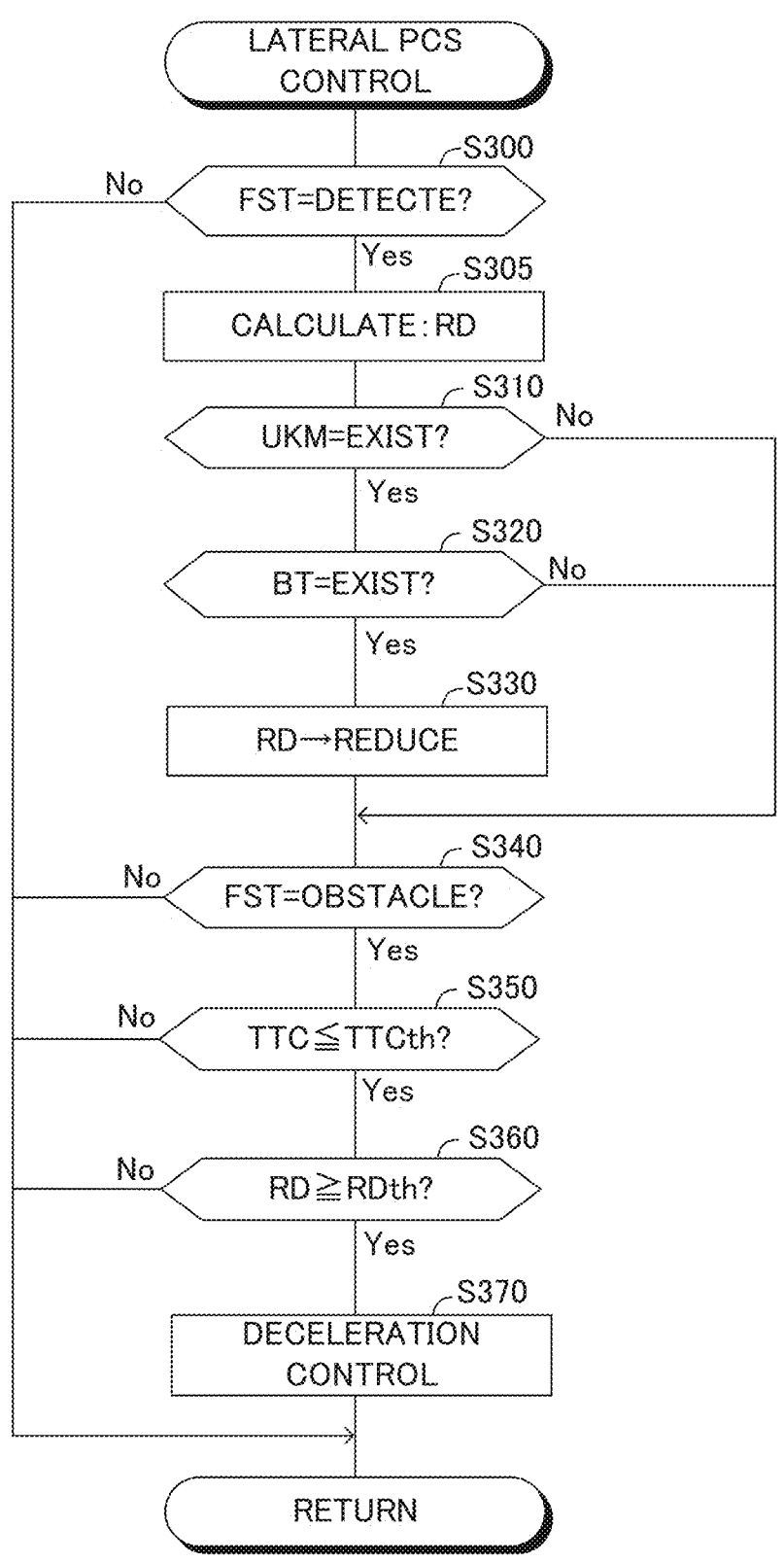
FIG. 6 is a flow chart for explaining a routine of lateral PCS Control.

FIG. 6 is a flow chart illustrating a routine of a process of lateral PCS control by the ECU 10. This routine is started when own vehicle SV runs, and is executed in parallel with the routine of the reliability calculation process shown in FIG. 4.

In step S300, the ECU 10 determines whether the front-and-lateral millimeter-wave radar 43 has detected the front-and-lateral object FST. When the front-and-lateral millimeter wave radar 43 detects the front-and-lateral object FST (Yes), the ECU 10 sequentially executes process of step S305 and step S310. On the other hand, when the front-and-lateral millimeter wave radar 43 does not detect the front-and-lateral object FST (No), the ECU 10 returns this routine.

In step S305, the ECU 10 obtains the reliability RD of the front-and-lateral object FST. Specifically, the ECU 10 acquires the reliability RD stored in RAM by the execution of step S238 of the reliability calculation process shown in FIG. 4. Next, in step 310, the ECU 10 determines whether a moving object UKM which type is unknown is exist in the front-and-lateral objects FST or not, based on the detection result of the external sensor device 40. If the moving object UKM of unknown type is exist (Yes), the ECU 10 proceeds the process to step S320. On the other hand, if no moving object UKM of unknown type is exist (No), the ECU 10 proceeds to process in step S340.

In step S320, the ECU 10 determines whether a moving object UKM of unknown type is a ghost object, that is, whether an object that can be a main body (hereinafter, referred to as a main body an object BT) exists in a predetermined area in the vicinity of the moving object UKM of unknown type. Here, if all of the moving object UKM of unknown type are ghost objects, there is a possibility that moving objects such as crossing vehicles and pedestrians are excluded from the target of the lateral PCS control.

The ECU 10 searches whether the main body object BT existing in a predetermined area around the moving object UKM of unknown type. In regard to the preceding vehicle V1, as indicated by a broken line in FIG. 5A, the search range (i.e., the predetermined range) of the main body object BT (vehicle body VB) of the vehicle width direction (lateral direction) is defined as the width W1 of the adjacent lane L2 adjacent to the lane L1 on which own vehicle SV is traveling, in order to prevent erroneous determination of other vehicles as the preceding vehicle. Further, as indicated by a broken line in FIG. 5A, the search range of the main body object BT of the traveling direction (vertical direction) is defined as the length S1 obtained by adding a predetermined margin to the length of one vehicle from the front side of own vehicle SV. In regard to the outdoor unit OU, as indicated by a broken line in FIG. 5B, the search range of the main body object BT (outdoor unit main body UB) is defined as the rectangular range RA with reference to the mean outer dimension of the outdoor unit. ECU 10 searches the main body object BT in the non-overlapping region ER based on an object information acquired by the front side millimeter-wave radar 43. Further, ECU 10 searches the main body object BT in the front detection region FR based on an object information acquired by the front camera 41 and the front radar sensor 42.

When acquiring the main body object BT continuously in the search range (predetermined range) for a predetermined time or longer, the ECU 10 recognizes the moving object UKM of unknown type as the ghost object. In this case, the ECU 10 determines "Yes" in step S320, and proceeds the process to step S330. On the other hand, when the main body object BT is not acquired continuously in the search range (predetermined range) for the predetermined time or longer, the ECU 10 determines "No" in step S320, and proceeds the process to step S340.

In step S330, the ECU 10 reduces the reliability RD by subtracting a predetermined quantity (e.g., from 10 to 30) from the reliability RD of the moving object recognized as a ghost object. As a result, it is possible to effectively suppress the reliability RD of the moving object recognized as the ghost object from being equal to or higher than the threshold-reliability RDth at the step S350 later-described. That is, unnecessary operation of the deceleration control can be suppressed.

In step S340, the ECU 10 determines whether the front-and-lateral object FST is an obstacle that may collide with own vehicle SV. If the front-and-lateral object FST is an obstacle (Yes), the ECU 10 proceeds the process to step S350. On the other hand, if the front-and-lateral object FST is not an obstacle (No), the ECU 10 returns this routine.

In step S350, the ECU 10 determines whether TTC is less than or equal to the collision determination thresholds TTCth. If TTC is less than or equal to the collision-determination-threshold TTCth (Yes), the ECU 10 proceeds the process to step S360. On the other hand, if TTC is not less than or equal to the collision-determination-threshold TTCth (No), the ECU 10 returns this routine.

In step S360, the ECU 10 determines whether the reliability RD of the moving object is equal to or greater than the threshold-reliability RDth. If the reliability RD is greater than or equal to the threshold reliability RDth (Yes), the ECU 10 proceeds the process to step S370. On the other hand, if the reliability RD is not greater than or equal to the threshold reliability RDth (No), the ECU 10 returns this routine. Note that process of step S360 and procedure of steps S340, S350 are out of order, and process of step S360 may be executed prior to process of step S340. In step S370, the ECU 10 executes a deceleration control to decelerate own vehicle SV based on the target deceleration, and then returns the routine.

Although the control device, the control method, and the program of the vehicle according to the present embodiment have been described above, the present disclosure is not limited to the above embodiment, and various modifications can be made without departing from the object of the present disclosure.

What is claimed is:

1. A vehicle control device, comprising:

an object detection unit including a forward camera and a pair of front-and-lateral millimeter wave radars configured to detect an object located in front and diagonally forward of an own vehicle as a diagonally forward object; and an electronic control unit including at least one processor configured to:

calculate a reliability degree of the diagonally forward object based on at least one of:

(i) whether the diagonally forward object is located in an overlapping region where a detection region of the pair of front-and-lateral millimeter wave radars and a capture region of the forward camera overlap, or (ii) whether an abnormal condition is satisfied;

calculate a time-to-collision with respect to the diagonally forward object;

execute a collision avoidance control to decelerate the vehicle only when the reliability degree is equal to or greater than a first predetermined threshold and the time-to-collision is equal to less than a second predetermined threshold for avoiding a collision between own vehicle and the diagonally forward object by the object detection unit or reducing damage to the collision when the diagonally forward object satisfies a predetermined collision condition; and suppress the collision avoidance control based on the diagonally forward object when a moving object or a stationary object is detected within a predetermined area in a vicinity of the diagonally forward object by the object detecting unit.

2. The vehicle control device according to claim 1, wherein the abnormal condition includes at least one of:

(a) a radar-reflected cross-sectional area is less than or equal to a third threshold, (b) a magnitude of a difference between a total length of the diagonally forward object detected in a current detection and a total length of the diagonally forward objected detected in a previous detection is equal to or greater than a fourth threshold, or (c) a magnitude of a different between an angle formed by a relative moving direction of the diagonally forward object detected in the current detection and a longitudinal axis of the own vehicle and an angle formed by a relative moving direction of the diagonally forward object detected in the previous detection and the longitudinal axis of the own vehicle is equal or greater than a fifth threshold.

3. A vehicle control method which is applied to a vehicle, the vehicle control method comprising:

detecting an object located in front and diagonally forward of the vehicle by an object detection unit including a forward camera and a pair of front-and-lateral millimeter wave radars;

calculating, by a processor, a reliability degree of the detected object based on at least one of:

(i) whether the detected object is located in an overlapping region where a detection region of the pair of front-and-lateral millimeter wave radars and a capture region of the forward camera overlap, or (ii) whether an abnormal condition is satisfied;

calculating, by the processor, a time-to-collision with respect to the detected object;

executing a collision avoidance control to decelerate the vehicle only when the reliability degree is equal to or greater than a first predetermined threshold and the time-to-collision is equal to or less than a second predetermined threshold for avoiding a collision between the vehicle and the detected object or reducing damage to the collision when the detected object satisfies a predetermined collision condition; and suppressing the collision avoidance control based on the one moving object when a moving object or a stationary object is detected within a predetermined area in a vicinity of the detected object.

4. A non-transitory computer-readable medium storing a program which causes a processor to perform steps comprising:

detecting an object located in front and diagonally forward of the vehicle using an object detection unit including a forward camera and a pair of front-and-lateral millimeter wave radars;

calculating a reliability degree of the detected object based on at least one of:

(i) whether the detected object is located in an overlapping region where a detection region of the pair of front-and-lateral millimeter wave radars and a capture region of the forward camera overlap, or (ii) whether an abnormal condition is satisfied;

calculating a time-to-collision with respect to the detected object;

executing a collision avoidance control to decelerate the vehicle only when the reliability degree is equal to or greater than a first predetermined threshold and the time-to-collision is equal to or less than a second predetermined threshold for avoiding a collision between own vehicle and the detected object or reducing damage to the collision when the detected object satisfies a predetermined collision condition; and suppressing the collision avoidance control based on the one moving object when a moving object or a stationary object is detected within a predetermined area in a vicinity of the detected object.

* * * * *